United States Patent
Ucar et al.

(10) Patent No.: US 11,414,088 B2
(45) Date of Patent: Aug. 16, 2022

(54) ANOMALOUS DRIVER DETECTION SYSTEM

(71) Applicant: Toyota Motor Engineering & Manufacturing North America, Inc., Plano, TX (US)

(72) Inventors: Seyhan Ucar, Mountain View, CA (US); Baik Hoh, Campbell, CA (US); Kentaro Oguchi, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 117 days.

(21) Appl. No.: 16/744,434

(22) Filed: Jan. 16, 2020

(65) Prior Publication Data
US 2021/0221382 A1 Jul. 22, 2021

(51) Int. Cl.
*B60W 40/09* (2012.01)
*G07C 5/08* (2006.01)
*G06V 20/58* (2022.01)
*B60W 50/00* (2006.01)
*G06V 20/62* (2022.01)

(52) U.S. Cl.
CPC .......... *B60W 40/09* (2013.01); *G06V 20/584* (2022.01); *G07C 5/0808* (2013.01);
(Continued)

(58) Field of Classification Search
CPC ................. B60W 40/08; B60W 40/09; B60W 2040/0818; B60W 2050/0075;
(Continued)

(56) References Cited

U.S. PATENT DOCUMENTS 9,147,353 B1 * 9/2015 Slusar .................... G06Q 40/08
9,165,477 B2 10/2015 Wilson
(Continued)

OTHER PUBLICATIONS

Marshall, "Nexar's AI Dashcam Could Stop Your Next Crash—and Definitely Collect Your Data," Wired, 2016, 8 pages (Last accessed on Jan. 15, 2020, https://www.wired.com/2016/11/nexars-ai-dashcam-stop-next-crash-definitely-collect-data/).
(Continued)

*Primary Examiner* — Russell Frejd
*Assistant Examiner* — Brandon Z Willis
(74) *Attorney, Agent, or Firm* — Christopher G. Darrow; Darrow Mustafa PC

(57) ABSTRACT

System, methods, and embodiments described herein relate to receiving observation data from a reporting entity, the observation data including location data and sensor information associated with a subject vehicle, analyzing the observation data to identify ADR behavior of the subject vehicle, obtaining secondary observation data from secondary reporting entities in a vicinity determined based on the location data, determining, based at least in part on the secondary observation data, that the subject vehicle has engaged in the ADR behavior or that the subject vehicle has not engaged in the ADR behavior, analyzing the observation data and the secondary observation data, when the subject vehicle has been confirmed to have engaged in the ADR behavior, to determine a measure of effect that the ADR behavior has had on other vehicles, and executing a responsive action associated with the subject vehicle based at least in part on the measure of effect.

20 Claims, 6 Drawing Sheets

(52) U.S. Cl.
CPC . *B60W 2050/0075* (2013.01); *B60W 2540/30* (2013.01); *B60W 2556/10* (2020.02); *G06V 20/625* (2022.01)

(58) Field of Classification Search
CPC ......... B60W 50/0097; B60W 2540/26; B60W 2540/30; B60W 2540/229; B60W 2540/24; B60W 2555/20; B60W 2554/4046; B60W 2554/4047; B60W 2554/4049; B60W 2554/406; B60W 2554/408; B60W 2556/10; B60W 2556/45; B60W 2756/10; G06K 9/00785; G06K 9/00825; G06K 9/00791; G06K 9/00845; G06K 2209/15; G07C 5/0808
See application file for complete search history.

(56) References Cited

U.S. PATENT DOCUMENTS

| | | | |
|---|---|---|---|
| 9,767,689 B1* | 9/2017 | Cain | G08G 1/096758 |
| 10,037,699 B1 | 7/2018 | Toyoda et al. | |
| 10,163,163 B1* | 12/2018 | He | A61B 5/18 |
| 10,540,892 B1* | 1/2020 | Fields | G08G 1/0112 |
| 2014/0236414 A1 | 8/2014 | Droz et al. | |
| 2016/0284212 A1* | 9/2016 | Tatourian | G08G 1/096725 |
| 2016/0357262 A1 | 12/2016 | Ansari | |
| 2017/0032673 A1* | 2/2017 | Scofield | H04L 9/3247 |
| 2018/0025636 A1 | 1/2018 | Boykin et al. | |
| 2019/0126935 A1 | 5/2019 | Phillips et al. | |
| 2019/0147260 A1* | 5/2019 | May | B60W 50/14 382/103 |
| 2019/0164422 A1 | 5/2019 | Bai et al. | |

OTHER PUBLICATIONS

Kim et al., "Probabilistic Vehicle Trajectory Prediction over Occupancy Grid Map via Recurrent Neural Network," 6 pages, arXiv:1704.07049v2 [cs.LG] Sep. 1, 2017.

* cited by examiner

ANOMALOUS DRIVER DETECTION SYSTEM

TECHNICAL FIELD

The subject matter described herein relates, in general, to a system and method for detecting anomalous driving, and, more particularly, to detecting when a driver engages in aggressive/distracted/reckless (ADR) driving and executing a measured responsive action.

BACKGROUND

Traditional traffic law enforcement and control measures, such as police force efforts and insurance repercussions, are relatively effective at addressing serious anomalous driving behavior, i.e., through fines, penalties and in worst cases, criminal charges that may result in loss of driving privileges or penitentiary sentencing. However, small scale anomalous behavior by drivers who in engage in aggressive/distracted/reckless (ADR) driving are more difficult for the traditional enforcement infrastructure to detect, much less address. Moreover, although roads present a common resource for large populations there is little incentive for a given individual user of the road to take steps or actions to preserve the overall state of the resource above taking full advantage of the resource for their own use as they see fit.

SUMMARY

The disclosed devices, systems and methods relate to detecting when a driver engages in aggressive/distracted/reckless (ADR) driving and executing a measured responsive action, such as adjusting a reputation value for the driver accordingly.

In one embodiment, a detection system, includes a communication system configured to receive observation data from a reporting entity, the observation data including location data and sensor information associated with a subject vehicle, one or more processors, and a memory communicably coupled to the one or more processors.

The memory can store an evaluation module including instructions that when executed by the one or more processors cause the one or more processors to analyze the observation data and identify ADR behavior of the subject vehicle.

The memory can also store a confirmation module including instructions that when executed by the one or more processors cause the one or more processors to obtain secondary observation data from one or more secondary reporting entities in a vicinity determined based on the location data and, based at least in part on the secondary observation data, confirm that the subject vehicle has engaged in the ADR behavior or determine that the subject vehicle has not engaged in the ADR behavior.

In addition, the memory can store a response module including instructions that when executed by the one or more processors cause the one or more processors to analyze, when the subject vehicle has been confirmed to have engaged in the ADR behavior, the observation data and the secondary observation data to determine a measure of effect that the ADR behavior has had on other vehicles in the vicinity and execute a responsive action associated with the subject vehicle based at least in part on the measure of effect.

In another embodiment, a method for detecting aggressive/distracted/reckless (ADR) driving includes receiving observation data from a reporting entity, the observation data including location data and sensor information associated with a subject vehicle, analyzing the observation data to identify ADR behavior of the subject vehicle, obtaining secondary observation data from one or more secondary reporting entities in a vicinity determined based on the location data, and determining, based at least in part on the secondary observation data, that the subject vehicle has engaged in the ADR behavior or that the subject vehicle has not engaged in the ADR behavior.

The method further includes, when the subject vehicle has been confirmed to have engaged in the ADR behavior, analyzing the observation data and the secondary observation data, to determine a measure of effect that the ADR behavior has had on other vehicles in the vicinity and executing a responsive action associated with the subject vehicle based at least in part on the measure of effect.

In still another embodiment, a non-transitory computer-readable medium for detecting aggressive/distracted/reckless (ADR) driving includes instructions that, when executed by one or more processors, cause the one or more processors to receive observation data from a reporting entity, the observation data including location data and sensor information associated with a subject vehicle, analyze the observation data to identify ADR behavior of the subject vehicle, obtaining secondary observation data from one or more secondary reporting entities in a vicinity determined based on the location data, and determine, based at least in part on the secondary observation data, that the subject vehicle has engaged in the ADR behavior or that the subject vehicle has not engaged in the ADR behavior.

The instructions further cause the one or more processors to analyze, when the subject vehicle has been confirmed to have engaged in the ADR behavior, the observation data and the secondary observation data, to determine a measure of effect that the ADR behavior has had on other vehicles in the vicinity and execute a responsive action associated with the subject vehicle based at least in part on the measure of effect.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with detecting when a driver engages in aggressive/distracted/reckless (ADR) driving and taking responsive action, such as adjusting a reputation value for the driver, are disclosed. As previously mentioned, traditional traffic law enforcement infrastructure is largely unable to detect and address small scale anomalous driving behavior, such as tailgating, frequent/fast lane changes, drifting across lanes, sudden stops/accelerations, etc. Although such behavior may not amount to infractions that draw the attention of traditional law enforcement, it often negatively impacts traffic conditions, accumulatively contributes to traffic jams and ultimately can lead to accidents.

Therefore, a detection system and associated methods are disclosed herein that provide an approach to identify vehicles that engage in ADR behavior and execute responsive action, e.g., penalize the behavior, according to a degree of impact, with escalating effects to discourage the drivers from continuing to employ disruptive driving practices. The disclosed embodiments can receive observation data (e.g., sensor data) from various types of reporting entities, such as other vehicles or stationary cameras. The observation data may indicate potential ADR behavior of a target vehicle. The disclosed embodiments can obtain secondary data to confirm, among other things, whether the target vehicle is the origin of the ADR behavior, verify that the action indicated in the observation data was not attributable to external factors (e.g., a pothole, debris in the road, flooded area, etc.), and to determine an impact level of the ADR behavior on the local traffic. In some instances, if the behavior is not a clear ADR behavior the system can share the event and associated data with a human operator for a final decision. The disclosed embodiments can retrieve an identifier for the target vehicle (e.g., a license plate number or a unique assigned identifier that can be generated and used in place of a license plate number until the license plate number is obtained when license plate information is not available or not detected) and a reputation score associated with the identifier. Based at least in part on the confirmation, verification and impact level, the disclosed embodiments can take responsive action, such as adjusting the reputation score or transmitting a command signal to limit a driving capability of the target vehicle.

Figure 1:
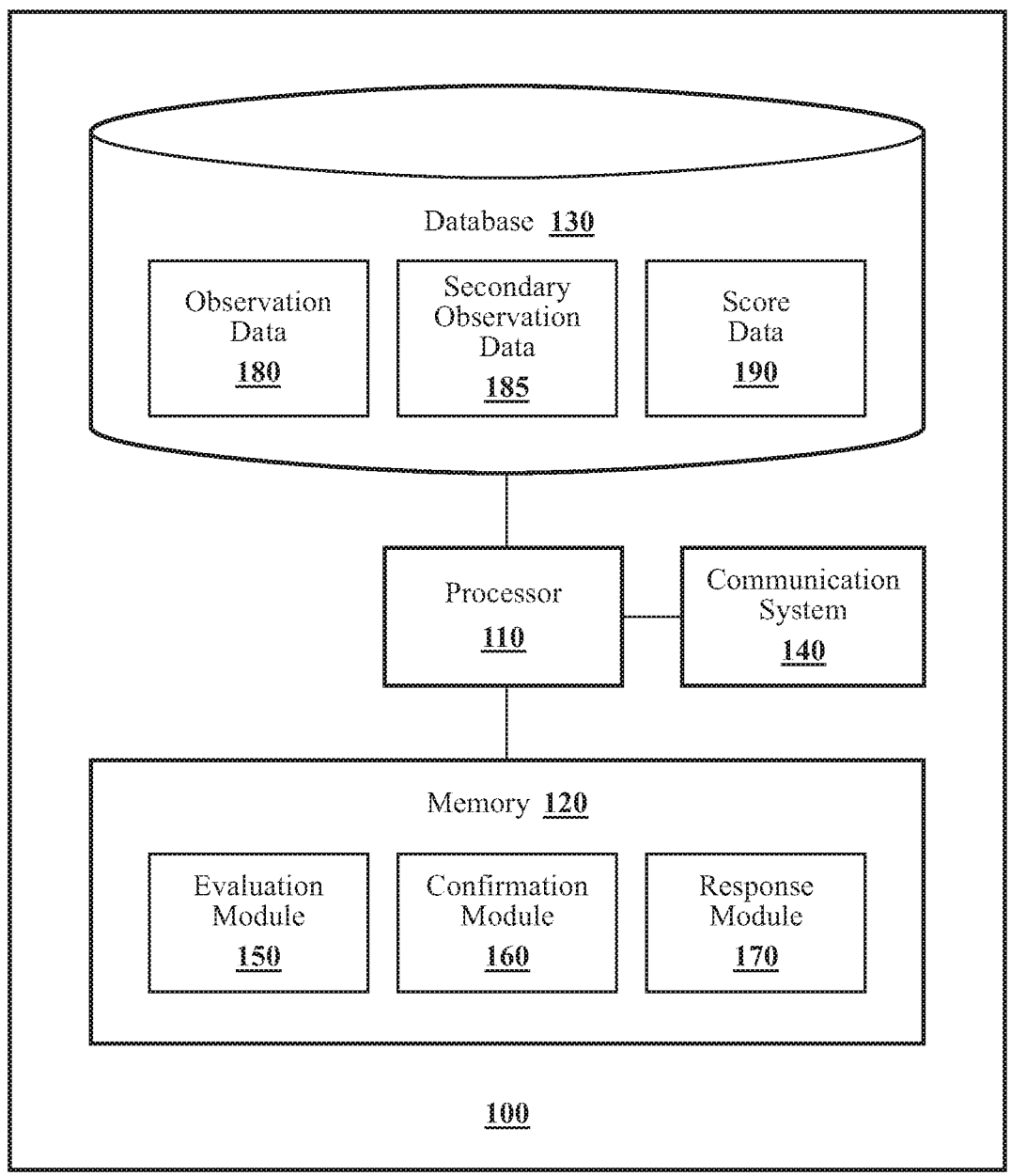
FIG. 1 illustrates one embodiment of a detection system according to the disclosed embodiments.

Referring to FIG. 1, one embodiment of a detection system 100 is illustrated. The detection system 100 can be implemented, for example, as a central server, a cloud-based computing device or other network-connected computing device that can communicate with one or more external devices, or a cluster of connected devices (e.g., vehicles). The detection system 100 is shown including a processor 110, a memory 120, database 130, and a communication system 140. In other embodiments more or fewer components than those shown can be included according to an implementation of the disclosed subject matter.

In one or more embodiments, the processor 110 may be a part of the detection system 100, or the detection system 100 may access the processor 110 through a network communication. The processor 110 may be one or more processors according the processing power required per implementation.

The memory 120 can be implemented as a random-access memory (RAM), read-only memory (ROM), a hard-disk drive, a flash memory, or other suitable memory for storing, among other things, an evaluation module 150, a confirmation module 160 and a response module 170. The modules 150, 160 and 170 will be described further below.

The database 130 can store, among other information, observation data 180, secondary observation data 185 and reputation score data 190, which will be also described further below. The database 130 is, in one or more embodiments, an electronic data structure that can be a data store integral with the detection system 100, a removable memory device that can be installed in or removed from the detection system 100, or another network-based data store that is accessible to modules 150, 160 and 170 stored in the memory 120. In one or more embodiments the database 130 can be publicly accessible. The database 130 is configured with routines that can be executed by the processor 110 for analyzing stored data, accessing and providing stored data, organizing stored data, and so on. Thus, in one embodiment, the database 130 stores and manages/updates data, such as observation data 180, secondary data 185 and reputation score data 190, as well as other types of data that is used by modules 150, 160 and 170 in executing various functions.

The communication system 140 can be implemented, for example, as a wireless communication system including one or more transmitting/receiving devices, one or more transmitting/receiving antennas and a controller for transmitting and receiving data over a wireless network using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The communication system 140 can also include vehicle-to-cloud, vehicle-to-datacenter and any type of V2V communication protocol. As will be described further below, the communication system 140 can be configured to receive observation data 180 and secondary observation data 185 from one or more reporting entities.

The modules 150, 160 and 170 can be, for example, constructed as computer-readable instructions that when executed by the processor 110 cause the processor 110 to perform the various functions disclosed herein.

The evaluation module 150 generally includes instructions that function to control the processor 110 to analyze received observation data 180. The observation data 180 can include time data, location data and sensor data associated with a target vehicle that potentially engaged in ADR behavior. Based on the observation data 180, the evaluation module 150 can identify ADR behavior of a target vehicle and detect a license plate of the target vehicle.

The confirmation module 160 generally includes instructions that function to control the processor 110 to obtain secondary observation data 185 from one or more secondary reporting entities present in a vicinity determined based on the location indicated by the observation data 180. Based at least in part on the secondary observation data 185, confirmation module 160 can confirm that the target vehicle has engaged in the ADR behavior, determine that the target vehicle has not engaged in the ADR behavior, or determine that environmental circumstances necessitated the apparent ADR behavior. As will be discussed further below, the confirmation module 160 may use different methods and data analysis techniques to determine whether a target vehicle has engaged in ADR behavior or whether the alleged ADR behavior is excusable, e.g., necessitated by external factors.

The response module 170 generally includes instructions that function to control the processor 110 to analyze, when the target vehicle has been confirmed to have engaged in the ADR behavior, the observation data and the secondary observation data to determine a measure of effect that the ADR behavior has had on other vehicles in the vicinity and to execute a responsive action associated with the target vehicle based on the measure of effect.

Herein, "measure of effect" refers to a way to indicate how much impact the ADR behavior of a given vehicle has on surrounding traffic. The measure of effect is at least partially connected with the overall level of traffic. That is, in a relatively low traffic situation the effect of ADR behavior may be relatively low, e.g., since there are less other vehicles present, vehicles that are present are comfortably spaced apart, etc. Conversely, in a relatively high traffic situation the effect of the ADR behavior may be considerably higher, e.g., due to the presence of an increased amount of vehicles, less space between vehicles, etc. In one or more embodiments, the measure of effect can be a value determined under an accumulated weighted score system in which various reactions to the ADR behavior are assigned score values, e.g., a vehicle forced to brake can be assigned a score value of "1", a vehicle forced to swerve out of a lane can be assigned a value of "2", a vehicle forced to brake due to a ripple effect can be assigned a value of "0.5", and so on.

Figure 2:
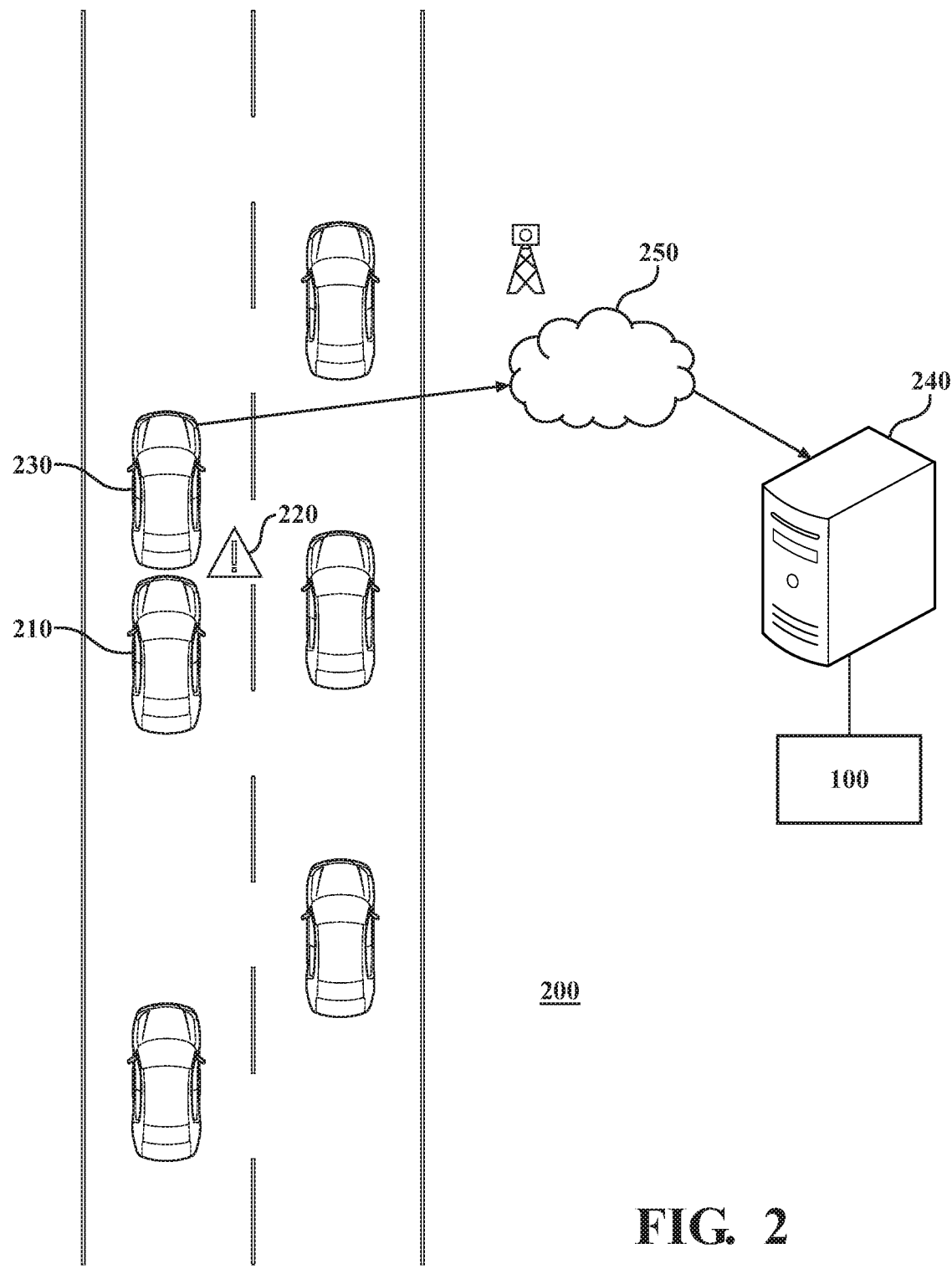
FIGS. 2-3 illustrate an example scene in which the disclosed detection system may be applied according to the disclosed embodiments.

FIG. 2 shows an example scene 200 in which the disclosed embodiments may be applied. In the example scene 200, a vehicle 210 is engaged in ADR behavior 220, e.g., aggressively tailgating vehicle 230. The vehicle 230 can include one or more on-board sensors (not shown). The on-board sensors can include, for example, one or more of rear-view cameras, rear-facing LIDAR, or other types of sensors that can generate data capturing the ADR behavior 220. In one or more implementations, the vehicle 230 can include a system (not shown) executing a machine learning algorithm trained to recognize categorical ADR behavior types (such as tailgating, frequent/fast lane changes, drifting, etc.) and thereby automatically detect the ADR behavior 220 based on sensor data from the on-board sensors. In one or more embodiments, when the machine learning system is unable to detect the ADR behavior 220 the system can initiate remote human support to provide identification.

In one or more embodiments the vehicle 230 system can stream observation data 180 live to a remote server 240 or select observation data 180 from among the sensor data according to a time of detection of the ADR behavior. For example, when the vehicle 230 system detects the ADR behavior at time T, the vehicle 230 system can tag on-board sensor data from time (T+30) to (T−30) seconds as observation data 180. The vehicle 230 system can transmit the observation data 180 to a remote server 240 implementing the disclosed detection system 100. For example, the vehicle 230 system wirelessly can transmit the observation data 180 via a network 250. In addition to the sensor data, the observation data 180 can include location data (e.g., geographic coordinates) indicating a location at which the observation data 180 was captured, timestamp data indicating a time at which the observation data 180 was captured, and velocity data indicating a speed and/or direction of travel of the reporting vehicle 230.

In one or more implementations, in addition to (or in alternative to) the vehicle 230 automatically capturing the observation data 180, a driver/passenger of the vehicle 230 may observe the ADR behavior 220 and manually trigger a data-capture operation to tag on-board sensor data for inclusion in a transmission to the remote server 240. For example, the vehicle 230 user interface can include a designated interface element, such as a visible "Report ADR" button or a designated audio command that the driver/passenger may readily utilize to input a command to tag the previous thirty seconds of on-board sensor data for transmission to the remote server 240.

In response to receiving the observation data 180, the remote server 240, i.e., the evaluation module 150, analyzes the observation data 180 to identify whether ADR behavior is indicated in the observation data 180. In one or more embodiments, the evaluation module 150 identifies ADR behavior, a target vehicle that has engaged in the ADR behavior and a license plate number of the target vehicle.

For example, referring to FIG. 2 the evaluation module 150 may receive observation data 180 in the form of video/image data captured from a rear camera of vehicle 230 showing vehicle 210 following close behind. The evaluation module 150 can include a machine learning algorithm, for example, a neural network trained to classify video/image data into one or more ADR categories. The evaluation module 150 can attempt to identify the type of ADR behavior (e.g., tailgating) and to identify the target vehicle that is engaged in the ADR behavior (e.g., obtain the license plate number of vehicle 210) based on the observation data 180 received from vehicle 230.

Different analysis techniques may be implemented to obtain the identity of the target vehicle and the indication of ADR behavior from the observation data 180. As another example, in one or more embodiments the evaluation module 150 can include autoencoders trained with distance-to-collision and speed profiles corresponding to normal behavior to allow the evaluation module 150 to differentiate ADR behavior by virtue of high reconstruction errors. Reconstruction errors can be expected to assume relatively lower values when an input sample is similar to a safe following distance and can conversely be expected to assume relatively high values when an input sample is different from training samples.

In any case, regardless of the technique employed the evaluation module 150 may encounter significant challenges in obtaining the identity of the target vehicle and the indication of ADR behavior from the observation data 180, as many factors can affect the accuracy or even completion of the evaluation module 150 results. For example, the observation data 180 can contain image data at an angle, brightness level, sharpness level, etc., that is unrecognizable, prevents the machine learning algorithm from rendering a final determination or otherwise causes the machine learning algorithm to misclassify a benign scene as ADR behavior. Moreover, environmental circumstances may show, in context, the necessity of an action that appears, in isolation, to be ADR behavior. For example, a pothole or large debris in the road may force a vehicle to brake or quickly swerve into an adjoining lane where a second vehicle may perceive the maneuver as ADR behavior and trigger a transmission of observation data 180 to the remote server 240.

Datasets that result in inconclusive analysis may be flagged for review by human operators to analyze and assign a correct outcome. The dataset can then be included in training datasets for future use.

In addition to human operator review, to further improve the accuracy and reliability of analysis results the disclosed detection system 100 (e.g., confirmation module 160) can transmit one or more requests for secondary observation data 185. The secondary observation data 185 can include sensor data from one or more secondary entities and can provide additional perspectives of a subject vehicle and its alleged ADR behavior captured in the observation data 180.

Figure 3:
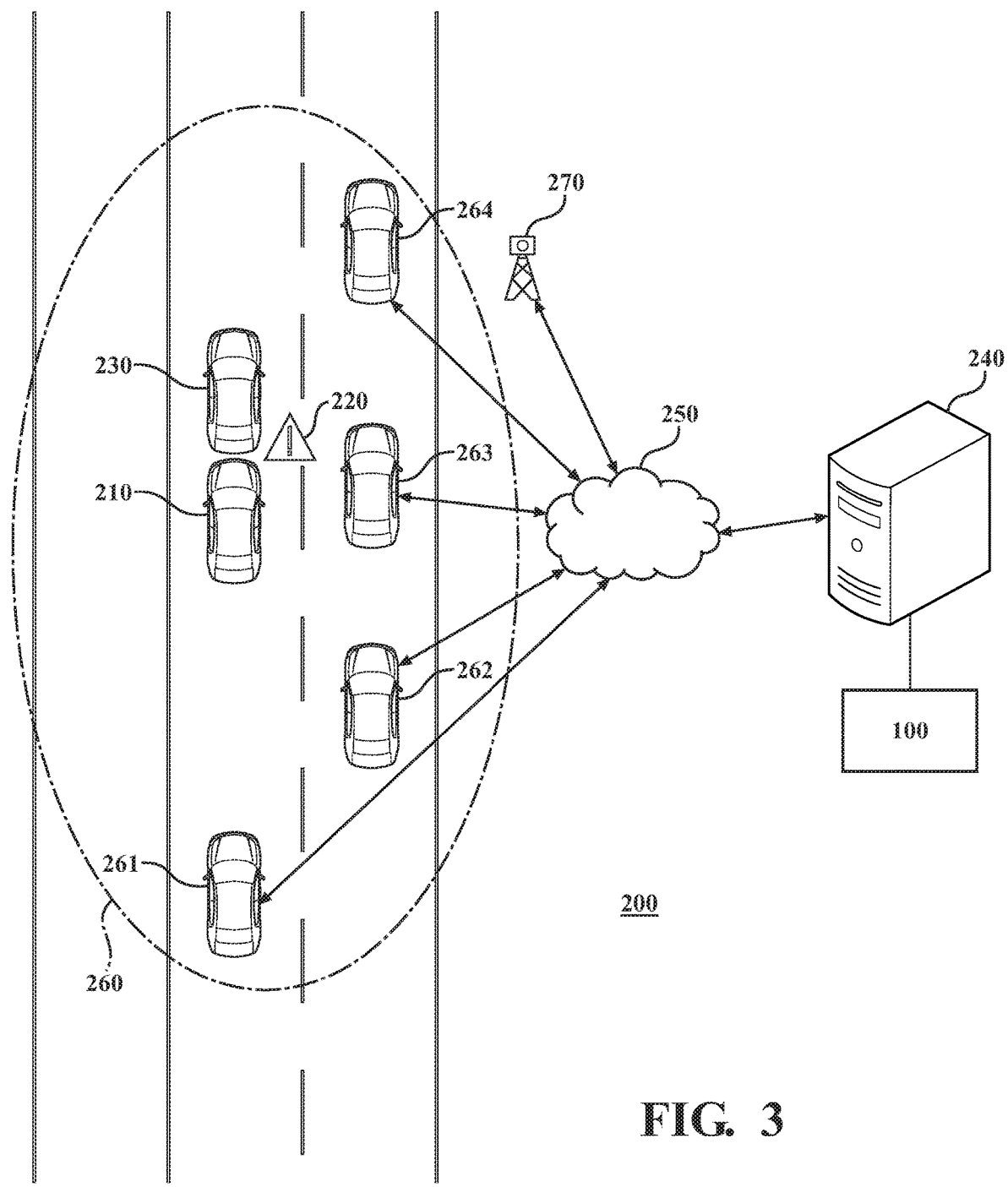

FIG. 3 continues the example scene 200. In one or more embodiments, the reporting vehicle 230 can transmit a message to secondary entities, such as other vehicles 261-264 present within a vicinity 260, requesting secondary observation data 185. The request for secondary observation data 185 can include location data and time data to inform the secondary entities of relevant temporal and spatial parameters of sensor data that would be responsive to the request. In one or more implementations the secondary entities can transmit responsive secondary observation data 185 to the remote server 240 or initiate live streams of secondary observation data 185 to the remote server 240 to allow the remote server 240 to monitor the situation. In one or more implementations the secondary entities can instead transmit a packet of responsive secondary observation data 185 to the reporting vehicle 230, which can in turn transmit the packet of secondary observation data 185 to the remote server 240.

In one or more embodiments, instead of or in addition to the reporting vehicle 230 sending out requests, the confirmation module 160 can determine the local vicinity 260 based on location data contained in the observation data 180 and transmit one or more requests for secondary observation data 185 to secondary entities, such as other vehicles 261-264 present within the vicinity 260. In one or more embodiments, the bounds of the local vicinity 260 can be defined as an area having a predetermined diameter (e.g., 300 meters), or an area having a diameter determined based at least in part on circumstantial factors, such as speed of the vehicle, the type of road, etc.

In one or more embodiments, the reporting vehicle 230 and/or the confirmation module 160 can transmit a request for secondary observation data 185 to one or more traffic cameras 270, nearest to the local vicinity 260, that may provide another view of the scene 200.

In any case, the secondary entities (e.g., vehicles 261-264 and traffic camera 270) can transmit secondary observation data 185 in the form of data packets and/or live stream that is received by the remote server 240. The disclosed detection system 100 (e.g., confirmation module 160) can analyze the secondary observation data 185 primarily either to confirm that the subject vehicle, i.e., vehicle 210, has engaged in the ADR behavior or to determine that the subject vehicle has not engaged in the ADR behavior. For example, the secondary observation data 185 may indicate that the vehicle 210 did not tailgate the vehicle 230 during a substantially identical time frame as indicated in the observation data 180 and/or, in the case of live stream data, is currently not tailgating. In this case the confirmation module 160 can determine that not enough corroborating evidence exists to support the conclusion that the vehicle 210 engaged in ADR behavior. When the data is inconclusive, as in this example, in one or more embodiments the disclosed detection system 100 can monitor the situation for a length of time and if no ADR behavior occurs, take no further action regarding the alleged ADR occurrence.

Conversely, the secondary observation data 185 may indicate that ADR behavior has occurred, i.e., that the vehicle 210 did tailgate the vehicle 230 during a substantially identical time frame as indicated in the observation data 180. In this case, the confirmation module 160 can reliably confirm, on the basis of multiple sources, that the subject vehicle (i.e., vehicle 210) engaged in ADR behavior.

In some situations, however, environmental circumstances can necessitate a maneuver that appears to be ADR behavior. For example, a pothole or large debris may be obstructing the road, or ADR behavior of a prior vehicle may have forced the subject vehicle to swerve, etc. Accordingly, before reaching a final conclusion that the subject vehicle has engaged in ADR behavior, in one or more embodiments the confirmation module 160 can analyze the observation data 180 and the secondary observation data 185 to determine whether there is any indication that environmental conditions are a factor. The confirmation module 160 can utilize one or more different analysis techniques to check for environmental circumstances.

For example, if a common obstacle is present in a lane, it follows that multiple vehicles may execute similar maneuvers to avoid it. Based on this deduction, the confirmation module 160 can analyze secondary observation data 185 to determine whether any other vehicle in the vicinity has engaged in similar ADR behavior at the same location, e.g., multiple vehicles over a period of time braking or swerving at the same location. If no other vehicle has engaged similar ADR behavior at the same location, the confirmation module 160 can confirm that the target vehicle has engaged in the ADR behavior based at least in part on determining that no other vehicle in the vicinity has engaged in similar ADR behavior.

In addition to common obstacles, traffic density in general may increase the difficulty of isolating a source of ADR behavior from other vehicles that are affected by the behavior. That is, a source vehicle and affected vehicle both might exhibit similar driving patterns in densely populated road sections. In a densely packed roadway a small disturbance or abnormality caused by an anomalous driver may have cascading effects on multiple vehicles around, which can make distinguishing the source of anomalous behavior challenging.

To improve the accuracy of detecting ADR behavior in dense traffic conditions, in one or more embodiments the confirmation module 160 can include instructions to reject anomalous results within a range of a leading or foremost vehicle that engaged in ADR behavior. The range can be formulated as a function of traffic density and average speed in the road at any instant of time.

In one or more embodiments, when multiple ADR behavior incidents are reported from a location the confirmation module 160 can include instructions to attempt to pinpoint an origin of anomalous behavior based on finding a mean correlation between the traversal and acceleration profiles of adjacent vehicles. If a set of adjacent vehicles marked as anomalous demonstrates a correlation higher than a predefined threshold, all vehicles can be marked as normal.

When a subject vehicle has been confirmed to have engaged in ADR behavior and no environmental circumstances have been found to be the source of the behavior, the disclosed detection system 100 (e.g., response module 170) can determine a responsive action that the system 100 can execute, for example, to discourage the driver of the subject vehicle from continuing to practice such behavior or to attempt to prevent a possible accident from occurring. To improve the effectiveness of the responsive action, the response module 170 can determine a level of response proportionate to one or more of: 1) an impact of the ADR behavior on surrounding traffic, 2) a history of driving behavior associated with the subject vehicle, and 3) an analysis of upcoming road conditions.

In determining a proportionate response, for example, a subject vehicle that engages in a highly disruptive ADR maneuver and has engaged in such behavior multiple times before should receive a more severe responsive action than a subject vehicle that engages in a minimally disruptive ADR maneuver and has rarely engaged in such behavior in the past. Furthermore, the trustworthiness and reliability of the disclosed detection system 100 should be demonstrated in any responsive action executed by the system 100 to promote a favorable and positive reaction by a recipient of the responsive action.

Accordingly, in one or more embodiments the response module 170 can analyze the observation data 180 and the secondary observation data 185 to determine a measure of effect that the ADR behavior has had on other vehicles in the vicinity. As described above, the measure of effect value can be an accumulated weighted score value that indicates a level of impact that the ADR behavior inflicted on the surrounding traffic.

In one or more embodiments the response module 170 can also obtain an identification of the subject vehicle (e.g., via a license plate number or a unique assigned identifier) and an indication of a history of driving behavior associated with the subject vehicle. For example, the response module 170 can obtain a public driving record associated with the subject vehicle or driver of the subject vehicle. In one or more embodiments, the response module 170 can retrieve or create a reputation score associated with the subject vehicle or a driver of the subject vehicle.

The reputation score can be stored in the database 130 or in another location accessible to the response module 170. In one or more embodiments, the reputation score can be a numerical value falling within a predetermined range, e.g., 0-100, that indicates a measure of safe driving behavior historically exhibited by the driver/subject vehicle. When the subject vehicle does not have an associated score, the response module 170 can generate a score, e.g., an initial median score, or a score formulaically based on a public driving record associated with the vehicle or driver of the vehicle. As will be discussed further below, the disclosed detection system 100 can, on an ongoing basis, maintain score data 190 that includes respective reputation scores associated with a plurality of vehicles.

Accordingly, in one or more embodiments the response module 170 can execute a responsive action associated with the target vehicle based at least in part on the determined measure of effect and/or the reputation score associated with the driver/subject vehicle. For example, the response module 170 can utilize a formula to determine an amount $\Delta S$ to decrement the reputation score, e.g.:

$$\Delta S = \log E\left(\frac{10}{S}\right) \quad \text{(Eq. 1)}$$

where E is the effect value within a range of 1-200 and S is the reputation score within a range of 1-100. It should be understood that the formula (Eq. 1) is merely one example formulation for determining an amount to adjust a reputation score and that other formulations can be used in different implementations of the disclosed embodiments.

In one or more embodiments the responsive action can be selected from a range of potential actions, for example, escalating in severity based on reputation score S and score adjustment $\Delta S$. For example, the responsive action can be one or more of: adjusting a reputation score associated with the subject vehicle or driver of the subject vehicle, transmitting a warning to the vehicle notifying of the observed ADR behavior, transmitting a message to another vehicle in the vicinity requesting the driver to get the attention of the driver of the subject vehicle, transmitting a message to a law enforcement official notifying of the ADR behavior, and transmitting a signal to the subject vehicle to limit one or more driving capabilities of the subject vehicle.

That is, for example, in a situation in which the reputation score S associated with a vehicle falls below a threshold, the response module 170 can transmit a message to the subject vehicle or to a communication device of a driver of the subject vehicle informing: "Dear Mr./Mrs. Driver, your driver reputation score has been lowered by 20 points due to your tailgating behavior on Jan. 10, 2020 at 2:30 PM. An image capture of the event is attached for your review. Please be mindful of your driving behavior going forward."

Conversely, in one or more embodiments the reputation score S associated with a vehicle or driver can gradually improve over time, for example, by increasing an incremental amount for passage of a predetermined amount of time without negative incident reports. In one or more embodiments, a vehicle system (not shown) can further include instructions to monitor for positive driving behavior (e.g., stopping at a yellow light) to report to the disclosed system for improving the reputation score associated with the vehicle.

The driver reputation score can be available to relevant entities, such as insurance companies and law enforcement officials. Thus, real-world consequences, such as increase insurance premiums, may be attached to continually practicing driver behavior that results in a low reputation score.

Furthermore, in one or more embodiments the response module 170 can analyze upcoming road conditions and determine whether an elevated responsive action is warranted. For example, the response module 170 can obtain traffic reports and/or map data related to the road upon which the subject vehicle is travelling to determine whether the confirmed ADR behavior is likely to lead to a potential accident. In one or more embodiments the response module 170 can calculate an accident potential value based on the presence or absence of weighted factors, such as the number of times or amount of distance over which the subject vehicle has repeatedly engaged in the ADR behavior, the presence of intersections, sharp turns, poor weather conditions, etc.

When the accident potential value exceeds a threshold, the response module 170 can transmit a notification to a local law enforcement official. When the accident potential value exceeds a higher threshold indicating a high probability of an accident is imminent, in one or more embodiments the response module 170 can include access to command codes for participating vehicles that can disable or reduce one or more driving capabilities of a participating vehicle. For a participating vehicle, when the accident potential value exceeds the threshold the response module 170 can transmit a command to reduce the driving capability of the vehicle. Reducing driving capability can include, for example, setting a maximum speed, setting a countdown to a power-down, or triggering an immediate pull-over sequence. Accordingly, in a situation, for example, in which the participating vehicle has been observed repeatedly to engage in confirmed ADR behavior (e.g., swerving across lanes) and the response module 170 determines that there is a high traffic density ahead, the accident potential value may be exceeded, thereby triggering the response module 170 to transmit a power-down command code and a notification, e.g., "Dear Mr./Mrs. Driver, your vehicle is approaching a high traffic area and exhibiting dangerous behavior as shown in the attached images. To avoid an accident your vehicle will pull over momentarily."

Figure 4:
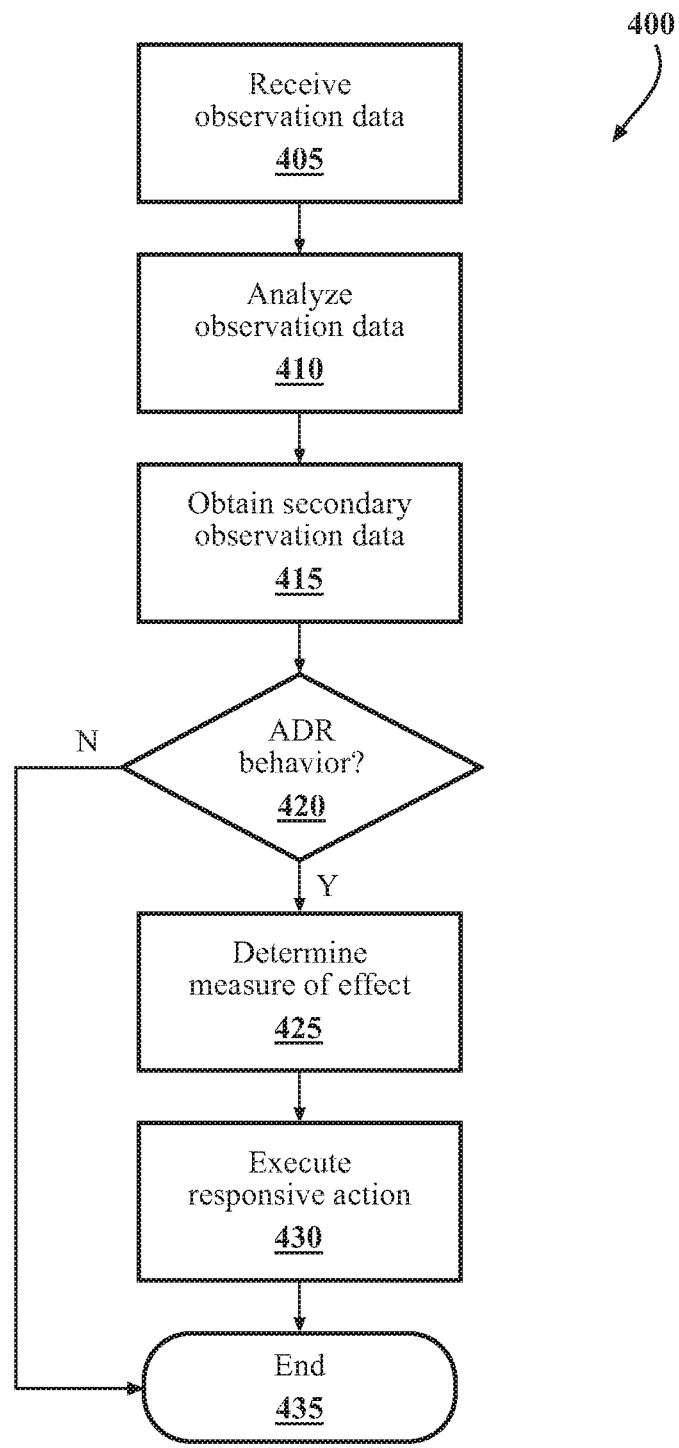
FIG. 4 illustrates a flowchart of a method of detecting and responding to ADR driving behavior according to the disclosed embodiments.

FIG. 4 illustrates a flowchart of a method 400 of detecting and responding to ADR driving behavior according to the disclosed embodiments. Method 400 will be discussed from the perspective of the detection system 100 of FIG. 1. While method 400 is discussed in combination with the detection system 100, it should be understood that the method 400 is not limited to implementation within the detection system 100, which is merely one example of a system that may implement the method 400. It should further be understood that the order of operations can change in various implementations of the method 400.

At operation 405 the detection system 100 receives observation data 180 from a reporting entity, the observation data 180 including location data and sensor information associated with a subject vehicle. The reporting entity can be, for example, a vehicle, a traffic camera, or other entity capable of capturing and transmitting observation data 180. The reporting entity can transmit the observation data 180 automatically or be triggered by a command manually entered by a user.

At operation 410 the detection system 100 (e.g., evaluation module 150) analyzes the observation data 180 and identifies ADR behavior of the subject vehicle. For example, in one or more embodiments the evaluation module 150 can include one or more machine learning algorithms trained to classify various types of ADR behavior in video or image data received in the observation data 180.

At operation 415 the detection system 100 (e.g., confirmation module 160) obtains secondary observation data 185 from one or more secondary reporting entities in a vicinity determined based on the location data. In one or more embodiments the reporting entity (e.g., a vehicle) can transmit a request to one or more secondary reporting entities in the vicinity, receive secondary observation data 185, and in turn transmit the secondary observation data 185 to the disclosed detection system 100. In one or more embodiments the confirmation module 160 can transmit one or more requests to one or more secondary reporting entities in a vicinity determined based on the location data.

At operation 420 the confirmation module 160, based at least in part on the secondary observation data 185, determines whether ADR behavior has occurred. For example, the confirmation module 160 can analyze the secondary observation data 185 and confirm that the subject vehicle has engaged in the ADR behavior or determine that the subject vehicle has not engaged in the ADR behavior based on the analysis.

Figure 5:
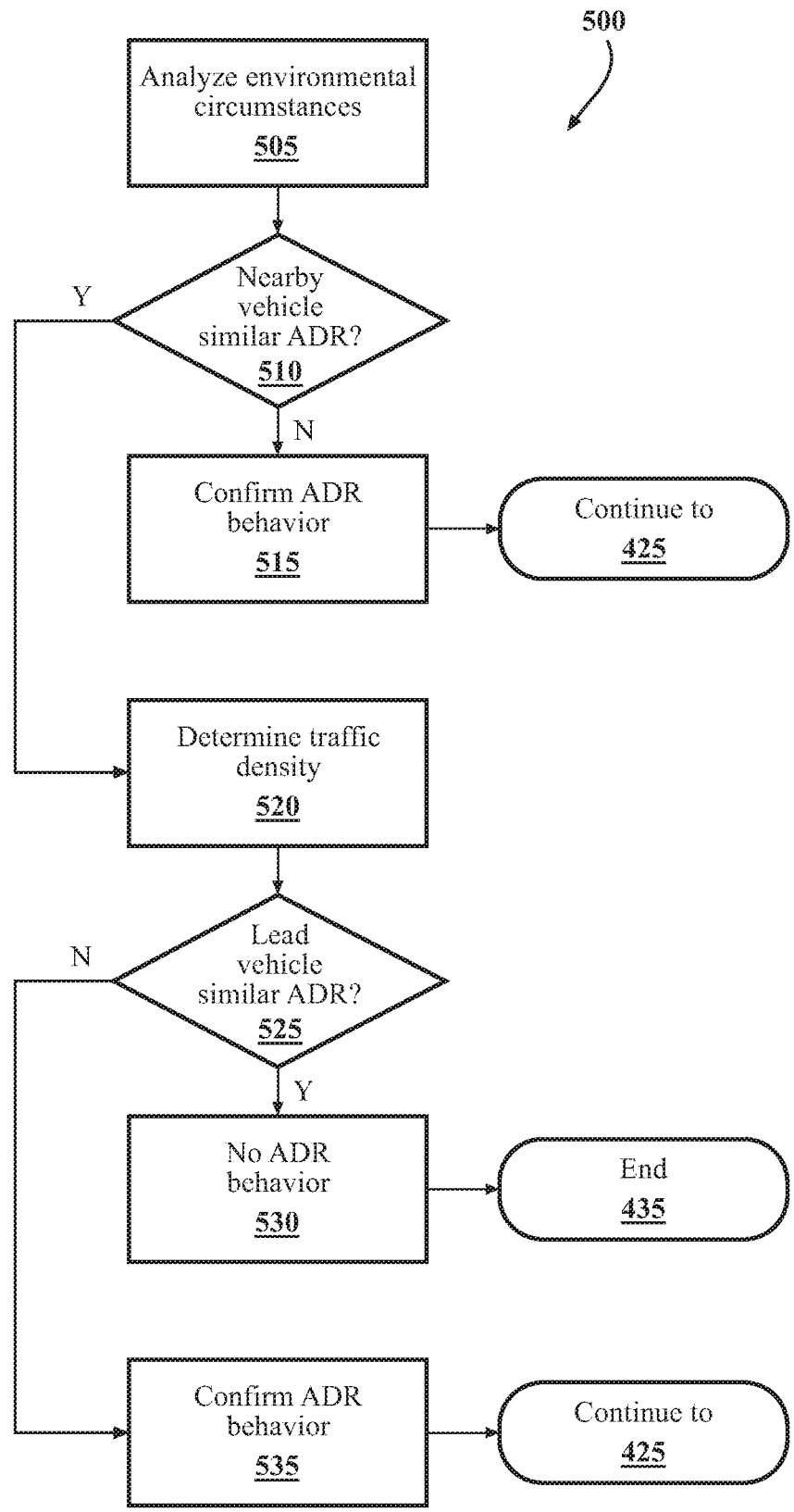
FIG. 5 illustrates a flow chart of a method of determining whether ADR behavior has occurred according the disclosed embodiments.

FIG. 5 illustrates a flowchart of a method 500 the confirmation module 160 can execute as at least part of the process of determining whether ADR behavior has occurred. It should be understood that the confirmation module 160 is not limited to implementation of the method 500; in one or more embodiments other types of analysis techniques can be used. It should further be understood that the order of operations can change in various implementations of the method 500.

At operation 505 the confirmation module 160 can analyze the observation data 180 and secondary observation data 185 to determine whether an environmental circumstance necessitated the ADR behavior. For example, at operation 510 the confirmation module 160 can determine whether any other vehicle in the vicinity has engaged in similar ADR behavior. If no other vehicle in the vicinity has engaged in similar ADR behavior, at operation 515 the confirmation module 160 can confirm that the subject vehicle has engaged in the ADR behavior and proceed to operation 425, as discussed further below.

If one or more other vehicles in the vicinity has engaged in similar ADR behavior, then the confirmation module 160 can determine a traffic density level at operation 520. At operation 525 the confirmation module 160 can determine whether the traffic density is above a threshold and a leading vehicle within a range of the subject vehicle has engaged in similar ADR behavior. If a leading vehicle within a range of the subject vehicle has engaged in similar ADR behavior, at operation 530 the confirmation module 160 can determine that the subject vehicle has not engaged in the ADR behavior but is instead being forced to mimic the leading vehicle ADR behavior which is, in effect, rippling through the dense traffic. The method then ends at operation 435 of method 400.

If no leading vehicle within a range of the subject vehicle has engaged in similar ADR behavior, at operation 535 the confirmation module 160 can confirm that the subject vehicle has engaged in the ADR behavior. The method then continues at operation 425 of method 400.

Referring back to FIG. 4, at operation 425 the detection system (e.g., response module 170) determines a measure of effect that the ADR behavior has had on other vehicles in the vicinity. For example, in one or more embodiments the response module 170 can assign a weighted value to various effect incidents to determine an accumulated impact score to function as a measure of effect of the ADR behavior.

At operation 430 the response module 170 executes a responsive action associated with the subject vehicle based at least in part on the measure of effect.

Figure 6:
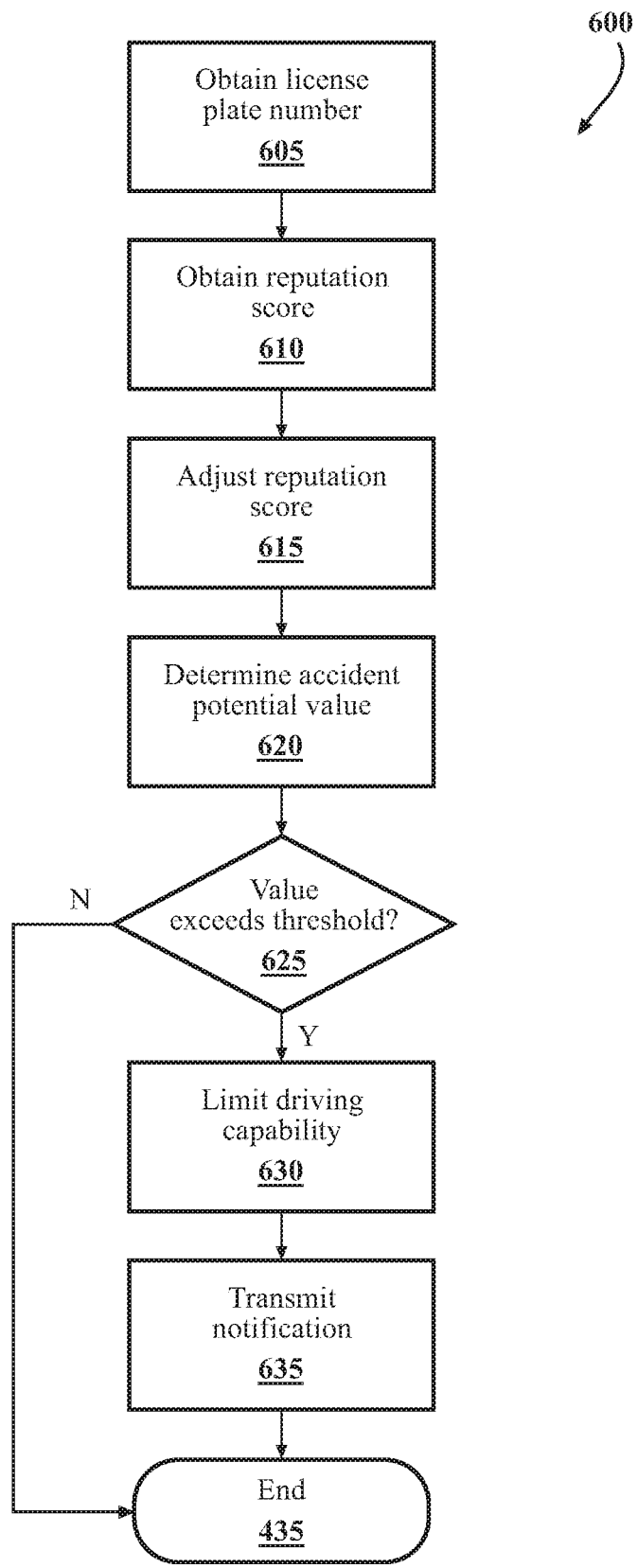
FIG. 6 illustrates a flow chart of a method of executing a responsive action according the disclosed embodiments.

FIG. 6 illustrates a flowchart of a method 600 the response module 170 can execute as at least part of the process of executing a responsive action. It should be understood that the response module 170 is not limited to implementation of the method 600; in one or more embodiments other types of execution or escalation techniques can be used. It should further be understood that the order of operations can change in various implementations of the method 600.

At operation 605 the detection system 100 can obtain a license plate number associated with the subject vehicle. For example, the license plate number can be obtained from the observation data 180 or the secondary observation data 185.

At operation 610 the response module 170 obtains a reputation score associated with the license plate number. If no reputation score exists, the response module 170 can create a new reputation score to associate with the license plate number.

At operation 615 the response module 170 adjusts the reputation score associated with the subject vehicle. For example, in one or more embodiments the response module 170 adjusts the reputation score by an amount based at least in part on the measure of effect, where a greater measure of effect results in a greater adjustment than a lesser measure of effect.

At operation 620 the response module 170 analyzes one or more road conditions of a road upon which the subject vehicle is traveling and determines an accident potential value based at least in part on the road conditions and the ADR behavior. The accident potential value indicates a likelihood of an accident occurring.

At operation 625 the response module 170 determines whether the accident potential value exceeds a threshold. If the the accident potential value exceeds the threshold, at operation 630 the response module 170 can transmit a control signal to the subject vehicle to implement a driving capability limitation on the subject vehicle as part of the responsive action.

At operation 635 the response module 170 can transmit a message to the subject vehicle or to a user device associated with a driver of the subject vehicle. The message can include information that provides notification about the adjusting of the reputation score and includes information indicating evidence of the ADR behavior selected from the observation data 180 and/or the secondary observation data 185. If the driving capability will be limited, the message can include an explanation informing of the pending limitation and the reasons for its application.

Thus, the disclosed detection system 100 can detect ADR driving behavior, distinguish the ADR behavior from other actions that resemble ADR behavior, determine an impact that the ADR behavior has on traffic and take responsive action aimed to discourage the ADR behavior and, in some cases, prevent a potential accident from occurring due to the behavior.

The detection system 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data stores of the detection system (e.g., database 130) may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for detecting aggressive/distracted/reckless (ADR) driving, comprising:
   a communication system configured to receive observation data from a reporting entity, the observation data including location data and sensor information associated with a subject vehicle;
   one or more processors; and
   a memory communicably coupled to the one or more processors and storing:
      an evaluation module including instructions that when executed by the one or more processors cause the one or more processors to analyze the observation data and identify ADR behavior of the subject vehicle;
      a confirmation module including instructions that when executed by the one or more processors cause the one or more processors to obtain secondary observation data from one or more secondary reporting entities in a vicinity determined based on the location data and, based at least in part on the secondary observation data, confirm that the subject vehicle has engaged in the ADR behavior or determine that the subject vehicle has not engaged in the ADR behavior; and
      a response module including instructions that when executed by the one or more processors cause the one or more processors to analyze, when the subject vehicle has been confirmed to have engaged in the ADR behavior, the observation data and the secondary observation data to determine a measure of effect that the ADR behavior has had on other vehicles in the vicinity and to execute a responsive action associated with the subject vehicle based at least in part on the measure of effect,
      wherein the responsive action includes:
         adjusting a reputation score associated with the subject vehicle by determining a change of the reputation score, the change of the reputation score being a value of a result of an equation comprising a quotient of a value of the measure of effect divided by a current value of the reputation score; and
         transmitting a message to the subject vehicle or to a user device associated with a driver of the subject vehicle, the message notifying of the adjusting of the reputation score and including information indicating evidence of the ADR behavior selected from the observation data and/or the secondary observation data.

2. The system of claim 1, wherein the evaluation module further includes instructions to:
   analyze the observation data to attempt to detect a license plate number of the subject vehicle; and
   generate a unique identifier when the license plate number is not detectable to use in place of the license plate number until the license plate number is obtained, and the reputation score is associated with the license plate number or the unique identifier until the license plate number is obtained.

3. The system of claim 1, wherein the response module further includes instructions to:
   analyze one or more road conditions of a road upon which the subject vehicle is traveling; and
   determine an accident potential value based at least in part on the one or more road conditions and the ADR behavior, the accident potential value indicating a likelihood of an accident occurring,
   wherein the responsive action includes transmitting a control signal to the subject vehicle to implement a driving capability limitation on the subject vehicle when the accident potential value exceeds a threshold.

4. The system of claim 1, wherein the confirmation module further includes instructions to:
   analyze the observation data and the secondary observation data to determine whether an environmental circumstance necessitated the ADR behavior; and
   determine that the subject vehicle has not engaged in the ADR behavior based at least in part on a determination that one or more environmental circumstances necessitated the ADR behavior.

5. The system of claim 4, wherein the instructions to determine whether the environmental circumstance necessitated the ADR behavior include instructions to:
   determine whether any other vehicle in the vicinity has engaged in similar ADR behavior; and
   confirm that the subject vehicle has engaged in the ADR behavior based at least in part on a determination that no other vehicles in the vicinity engaged in similar ADR behavior.

6. The system of claim 4, wherein the instructions to determine whether the environmental circumstance necessitated the ADR behavior include instructions to:
   determine a traffic density in the vicinity; and
   determine that the subject vehicle has not engaged in the ADR behavior based at least in part on a determination that the traffic density is above a threshold and a determination that a leading vehicle within a range of the subject vehicle engaged in similar ADR behavior.

7. A method for detecting aggressive/distracted/reckless (ADR) driving, comprising:
receiving observation data from a reporting entity, the observation data including location data and sensor information associated with a subject vehicle;
analyzing the observation data to identify ADR behavior of the subject vehicle;
obtaining secondary observation data from one or more secondary reporting entities in a vicinity determined based on the location data;
determining, based at least in part on the secondary observation data, that the subject vehicle has engaged in the ADR behavior or that the subject vehicle has not engaged in the ADR behavior;
analyzing the observation data and the secondary observation data, when the subject vehicle has been confirmed to have engaged in the ADR behavior, to determine a measure of effect that the ADR behavior has had on other vehicles in the vicinity; and
executing a responsive action associated with the subject vehicle based at least in part on the measure of effect, wherein the responsive action includes:
adjusting a reputation score associated with the subject vehicle by determining a change of the reputation score, the change of the reputation score being a value of a result of an equation comprising a quotient of a value of the measure of effect divided by a current value of the reputation score; and
transmitting a message to the subject vehicle or to a user device associated with a driver of the subject vehicle, the message notifying of the adjusting of the reputation score and including information indicating evidence of the ADR behavior selected from the observation data and/or the secondary observation data.

8. The system of claim 1, wherein the equation further comprises a log of a product, the product being equal to the quotient multiplied by ten.

9. The method of claim 7, further comprising:
analyzing the observation data to detect a license plate number of the subject vehicle, wherein the reputation score is associated with the license plate number.

10. The method of claim 7, further comprising:
analyzing one or more road conditions of a road upon which the subject vehicle is traveling; and
determining an accident potential value based at least in part on the one or more road conditions and the ADR behavior, the accident potential value indicating a likelihood of an accident occurring,
wherein the responsive action includes transmitting a control signal to the subject vehicle to implement a driving capability limitation on the subject vehicle when the accident potential value exceeds a threshold.

11. The method of claim 7, further comprising:
analyzing the observation data and the secondary observation data to determine whether an environmental circumstance necessitated the ADR behavior; and
determining that the subject vehicle has not engaged in the ADR behavior based at least in part on a determination that one or more environmental circumstances necessitated the ADR behavior.

12. The method of claim 11, wherein the determining whether the environmental circumstance necessitated the ADR behavior includes:
determining whether any other vehicle in the vicinity has engaged in similar ADR behavior; and
confirming that the subject vehicle has engaged in the ADR behavior based at least in part on a determination that no other vehicles in the vicinity engaged in similar ADR behavior.

13. The method of claim 11, wherein the determining whether the environmental circumstance necessitated the ADR behavior includes:
determining a traffic density in the vicinity; and
determining that the subject vehicle has not engaged in the ADR behavior based at least in part on a determination that the traffic density is above a threshold and a determination that a leading vehicle within a range of the subject vehicle engaged in similar ADR behavior.

14. The method of claim 7, wherein the equation further comprises a log of a product, the product being equal to the quotient multiplied by ten.

15. A non-transitory computer-readable medium for detecting aggressive/distracted/reckless (ADR) driving, including instructions that, when executed by one or more processors, cause the one or more processors to:
receive observation data from a reporting entity, the observation data including location data and sensor information associated with a subject vehicle;
analyze the observation data to identify ADR behavior of the subject vehicle;
obtain secondary observation data from one or more secondary reporting entities in a vicinity determined based on the location data;
determine, based at least in part on the secondary observation data, that the subject vehicle has engaged in the ADR behavior or that the subject vehicle has not engaged in the ADR behavior;
analyze the observation data and the secondary observation data, when the subject vehicle has been confirmed to have engaged in the ADR behavior, to determine a measure of effect that the ADR behavior has had on other vehicles in the vicinity; and
execute a responsive action associated with the subject vehicle based at least in part on the measure of effect, wherein the responsive action includes:
adjusting a reputation score associated with the subject vehicle by determining a change of the reputation score, the change of the reputation score being a value of a result of an equation comprising a quotient of a value of the measure of effect divided by a current value of the reputation score; and
transmitting a message to the subject vehicle or to a user device associated with a driver of the subject vehicle, the message notifying of the adjusting of the reputation score and including information indicating evidence of the ADR behavior selected from the observation data and/or the secondary observation data.

16. The non-transitory computer-readable medium of claim 15, further including instructions to:
analyze one or more road conditions of a road upon which the subject vehicle is traveling; and
determine an accident potential value based at least in part on the one or more road conditions and the ADR behavior, the accident potential value indicating a likelihood of an accident occurring,
wherein the responsive action includes transmitting a control signal to the subject vehicle to implement a driving capability limitation on the subject vehicle when the accident potential value exceeds a threshold.

17. The non-transitory computer-readable medium of claim 15, further including instructions to:

analyze the observation data and the secondary observation data to determine whether an environmental circumstance necessitated the ADR behavior; and determine that the subject vehicle has not engaged in the ADR behavior based at least in part on a determination that one or more environmental circumstances necessitated the ADR behavior.

18. The non-transitory computer-readable medium of claim 17, wherein the instructions to determine whether the environmental circumstance necessitated the ADR behavior include instructions to:

determine whether any other vehicle in the vicinity has engaged in similar ADR behavior; and confirm that the subject vehicle has engaged in the ADR behavior based at least in part on a determination that no other vehicles in the vicinity engaged in similar ADR behavior.

19. The non-transitory computer-readable medium of claim 17, wherein the instructions to determine whether the environmental circumstance necessitated the ADR behavior include instructions to:

determine a traffic density in the vicinity; and determine that the subject vehicle has not engaged in the ADR behavior based at least in part on a determination that the traffic density is above a threshold and a determination that a leading vehicle within a range of the subject vehicle engaged in similar ADR behavior.

20. The non-transitory computer-readable medium of claim 15, wherein the equation further comprises a log of a product, the product being equal to the quotient multiplied by ten.

* * * * *